Patented May 14, 1940

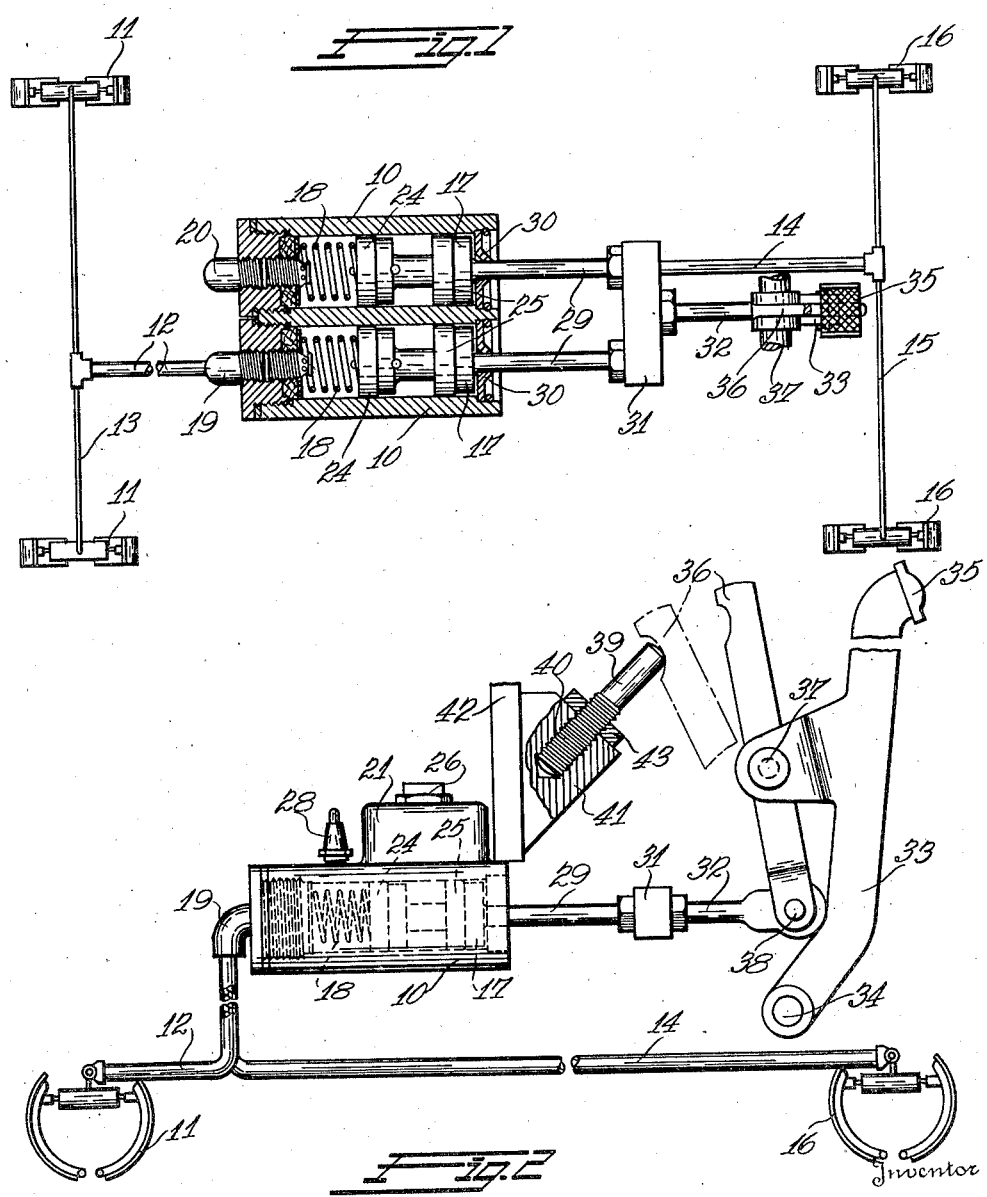

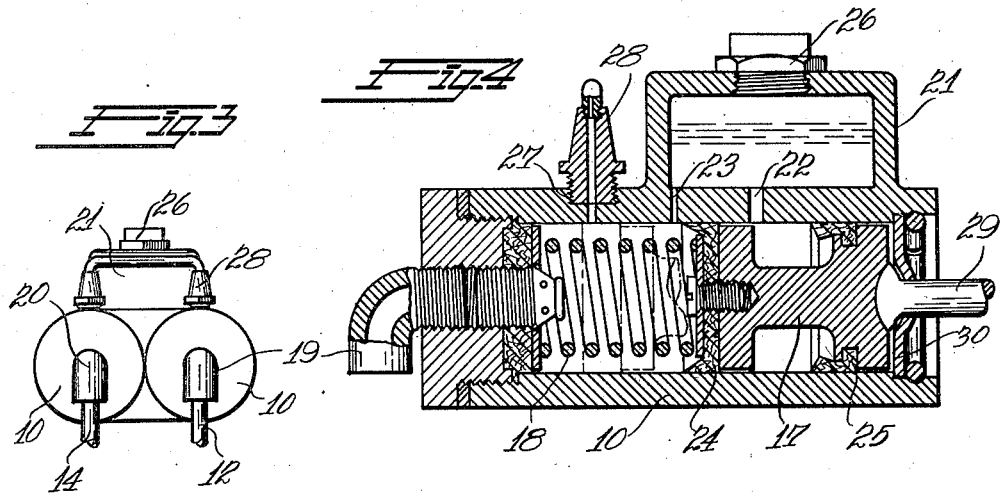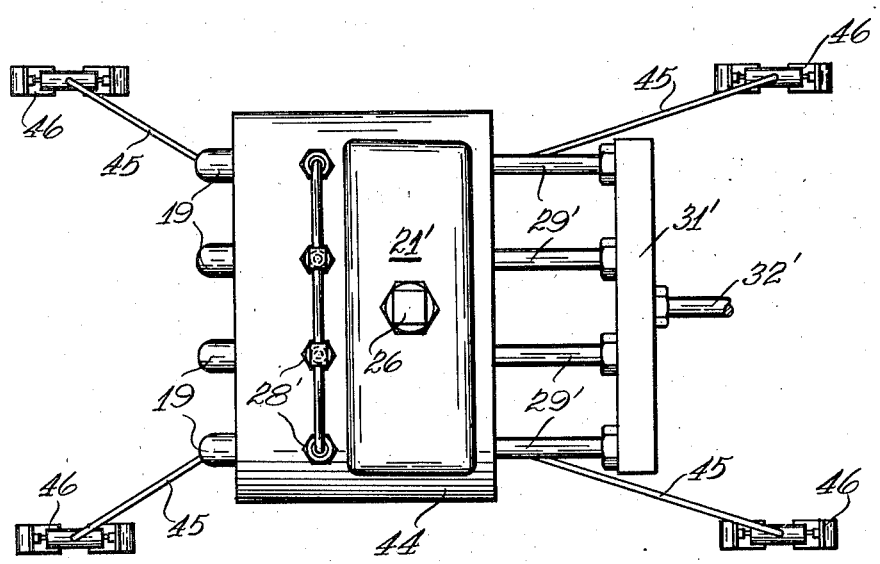

2,201,086

UNITED STATES PATENT OFFICE 2,201,086

SAFETY HYDRAULIC BRAKE STRUCTURE

Juel F. Guderian, Coquille, Oreg., assignor of one-fourth to James Richmond and one-fourth to Georgia G. Richmond, Coquille, Oreg.

Application June 15, 1939, Serial No. 279,367

2 Claims. (Cl. 188—152)

This invention relates to an hydraulic brake structure or mechanism and it aims generally to provide means which will render operation of such brakes safer and particularly in the case of leakage.

The invention is particularly applicable to a system having a plurality of master cylinders, for instance two or four, and it aims to provide means whereby through the travel of the pistons in the cylinders, communication between the cylinders will be cut off, thus rendering each master cylinder and associated brake or brakes, independent of the others so as to localize and minimize leakage.

Another object is to accomplish the result stated in combination with means which will increase the piston travel within the brake cylinder or cylinders to accomplish the end stated, without increasing the speed necessary for operation or depression of the brake pedal.

The more specific objects and advantages will become apparent from a consideration of the description following taken in connection with the accompanying drawings illustrating an operative embodiment.

In said drawings—

Figure 1 is a view in plan showing my improvements as used in a two master cylinder type of hydraulic brake mechanism, the cylinders being shown in horizontal section to disclose details;

Figure 2 is a view primarily in side elevation, partly broken away, of the parts of Figure 1, Figure 3 is an end elevation showing the master cylinders;

Figure 4 is a central vertical longitudinal sectional view through one of the master cylinders and Figure 5 is a plan view of a modified form, showing the invention applied to mechanism of the type having four master cylinders.

Referring specifically to the drawings and first to the form of Figures 1 to 4, two master cylinders are provided at 10 which are usually in unitary or coupled relation as shown, one of which communicates with and is associated with conventional hydraulic brake devices 11 for front wheels of a vehicle, through the medium of communicating conduits 12 and 13. The other of such cylinders communicates, through conduits 14 and 15, with conventional hydraulic brake devices 16, similar to those at 11.

Operating within the cylinders 10 are conventional pistons 17, urged to retracted position, as in full lines in the drawings, to normally maintain the devices 11 and 16 unapplied, through the medium of expansive springs 18 in the cylinders. The outlet connections from the cylinders 10 to the pipes 12 and 14 are shown at 19 and 20, respectively.

Mounted on the cylinders 10 is a reservoir or supply tank 21 adapted to contain hydraulic fluid which may enter the cylinders and cooperate with the pistons in the usual manner through ports 22, aided by relief ports 23. Pistons 17 are shown as of the usual spool type, having a conventional packing cup as at 24 at one end thereof and a packing ring as at 25. Tank or reservoir 21 may be filled through an opening normally closed by a screw plug at 26.

In accordance with the present invention, ports 27 are provided through the cylinder walls in the rear of the forward limit of movement of the pistons 17 and a tube or conduit means 28 is secured to both cylinders and establishes communication between such cylinders.

Said pistons 17 have rods 29 extending exteriorly thereof which are slidably mounted in fluid-tight end closures 30 of the cylinders and joined by a crosshead 31 from which a push rod 32 extends normally into contact with a brake pedal lever pivoted as at 34. The pedal proper is shown at the upper end of lever 33 as at 35. Above rod 32, an auxiliary lever 36 is pivoted at 37 to lever 33 and at 38 to the rod 32. Such lever 36 is normally maintained in the position shown in Figure 2 through the action of the springs 18.

On a suitable part of the automobile or vehicle equipped with my improvements, a stop or abutment element 39 is mounted for contact by the upper end of the lever 36. This stop 39 is shown as provided with screw threads at 40 engaging a bracket 41 on the dashboard 42 of the vehicle, a lock nut 43 engaging the threads 40 and bracket 41.

On most cars, the brake pedal such as 33 has six inches travel before it touches the floorboard, and such six inches travel imparts from one and one-quarter to one and one-half inches of travel to the master cylinder pistons 17. This is given by way of example, since the travel and operation will depend on the size of the master cylinders and other parts of the hydraulic brake mechanism. When such pedal 33 is pushed for instance three and one-half inches toward the floorboard, the pistons 17 will have just closed the brake equalizer and safety tube ports 27, thus cutting off communication between the master cylinders, and rendering them independent of each other, thus restricting possible leakage in one of them in case of impairment, and minimizing fluid losses and increasing safety, and enabling operation for a time sufficient to obtain necessary repairs.

Obviously the rod 32 may be connected to the lever 33 or operated by the same at a similar speed, under all conditions. However, I prefer to increase the speed of travel of the pistons, for instance after the foot pedal has traveled the three and one-half inches as mentioned, to more rapidly cut off communication between the master cylinders. To this end, the pistons will travel at the same speed as the lever 33, due to the contact of the rod 32 therewith, until the upper end of lever 36 abuts the stop 39, whereupon further movement of the lever 33 toward the floorboard, rocks lever 36 relatively to lever 33, on pivot 37, and moving rod 32 and the pistons 17 away from lever 33 and at a greater speed, thus further increasing safety. It will be noted that although the speed of travel of the pistons is increased, it does not require an increase in the speed of operation of the foot pedal 33.

A modification is shown in Figure 5 wherein a unit 44 of four units or hydraulic cylinders and cooperating pistons is shown, each piston cooperating through a conduit 45 with a brake device or mechanism 46 at each of the four wheels of the vehicle. Associated with the cylinders is a supply tank for the hydraulic fluid at 21' communicating with each cylinder through the medium of ports like those at 22 and 23 and all of the cylinders having an equalizing tube or conduit 28' communicating with each cylinder, at the same relative location as the conduit 28 in the previous form, and coacting with the pistons in the cylinders in the same manner. All four pistons have rods 29' extending exteriorly of the cylinders and connected by a crosshead 31' which in turn through a rod 32', is adapted for operation by levers 33 and 36 in the identical manner as in the preceding form of the invention. The operation is the same in this form as in the preceding form except that the four cylinders and pistons are operated through the depression of the brake pedal lever 33 instead of two as in the first form, and in which form of Figure 5, all four brake devices 46 will be out of communication with another when the pistons are in forward position, like the dotted line position in Figure 4.

Various changes may be resorted to provided they fall within the spirit and scope of the invention.

I claim as my invention:

1. In a fluid operated brake system, cylinders, brake devices operable one from each cylinder, means establishing communication between the cylinders, pistons operable in the cylinders, said means being disposed for closing through movement of one of the pistons to apply the brakes, a lever operable to apply the brakes, and means associated with said lever operable to move the pistons faster than the lever following initiation of movement of the lever.

2. In a fluid operated brake system, cylinders, brake devices operable one from each cylinder, means establishing communication between the cylinders, pistons operable in the cylinders, said means being disposed for closing through movement of one of the pistons to apply the brakes, a lever operable to apply the brakes, and means associated with said lever operable to move the pistons faster than the lever following initiation of movement of the lever, consisting of a lever pivoted to the first mentioned lever and to the piston, and abutment means for engagement by the second mentioned lever on the opposite side of its fulcrum to the pistons.

JUEL F. GUDERIAN.